(12) United States Patent
Sawyer et al.

(10) Patent No.: US 10,556,488 B2
(45) Date of Patent: Feb. 11, 2020

(54) VOLATILE ORGANIC COMPOUND PURGE SYSTEM FOR A MOTOR VEHICLE

(71) Applicant: FORD GLOBAL TECHNOLOGIES, LLC, Dearborn, MI (US)

(72) Inventors: Robert Steven Sawyer, Farmington Hills, MI (US); Thomas A. White, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1024 days.

(21) Appl. No.: 14/605,122

(22) Filed: Jan. 26, 2015

(65) Prior Publication Data

US 2016/0214459 A1  Jul. 28, 2016

(51) Int. Cl.
*B60H 1/24* (2006.01)
*B60H 3/00* (2006.01)
*B60H 1/26* (2006.01)

(52) U.S. Cl.
CPC ............. *B60H 1/243* (2013.01); *B60H 1/267* (2013.01); *B60H 3/0085* (2013.01)

(58) Field of Classification Search
CPC ....... B60H 1/0085; B60H 1/243; B60H 1/267
USPC .......................................................... 454/75
See application file for complete search history.

(56) References Cited

U.S. PATENT DOCUMENTS

| | | | | |
|---|---|---|---|---|
| 2,919,638 A | * | 1/1960 | Mathews | B60H 1/267 296/152 |
| 3,690,717 A | * | 9/1972 | Taylor | B60P 3/08 410/24.1 |
| 5,525,026 A | * | 6/1996 | DeMonte | B60P 1/02 410/24 |
| 5,588,909 A | * | 12/1996 | Ferng | B60H 1/00428 454/141 |
| 6,808,450 B2 | * | 10/2004 | Snow | B60H 1/00428 454/137 |
| 2008/0283626 A1 | | 11/2008 | Aldana et al. | |
| 2009/0184579 A1 | * | 7/2009 | Owens, Jr. | B60R 16/0236 307/10.7 |
| 2010/0163573 A1 | * | 7/2010 | Wegelin | B67D 1/0078 222/1 |

(Continued)

FOREIGN PATENT DOCUMENTS

CN   103538446 A  *  1/2014
JP   2004161093 A     6/2004

(Continued)

OTHER PUBLICATIONS

English machine translation of the description for CN103538446.

(Continued)

*Primary Examiner* — Steven B McAllister
*Assistant Examiner* — Allen R Schult
(74) *Attorney, Agent, or Firm* — Vichit Chea; King & Schickli, PLLC

(57) ABSTRACT

A volatile organic compound purge system is provided for a motor vehicle. The purge system includes a blower and a computing device. The computing device is configured to operate in a shipping mode whereby the blower is periodically operated to draw fresh air into and purge volatile organic compounds from an interior of the motor vehicle as the motor vehicle is being shipped from a first point to a second point.

13 Claims, 4 Drawing Sheets

(56) References Cited

U.S. PATENT DOCUMENTS

| | | | |
|---|---|---|---|
| 2012/0291799 A1* | 11/2012 | Almlie | B01D 46/0068 134/1 |
| 2013/0078075 A1* | 3/2013 | Francois | B60H 1/00014 414/800 |
| 2014/0161675 A1 | 6/2014 | Lee et al. | |
| 2015/0217628 A1* | 8/2015 | Talarico | B60H 1/00264 454/75 |

FOREIGN PATENT DOCUMENTS

| | | | |
|---|---|---|---|
| JP | 2005041356 A | | 2/2005 |
| JP | 2005075323 A | | 3/2005 |
| JP | 2005138632 A | * | 6/2005 |

OTHER PUBLICATIONS

English machine translation of the description for JP2004161093.
English machine translation of the description for JP2005138632.
English machine translation of the description for JP2005075323.
English machine translation of JP2005041356A dated Feb. 17, 2005.
Office Action dated Aug. 21, 2019 for CN Application No. 2016100407337 filed Jan. 21, 2016.

\* cited by examiner

VOLATILE ORGANIC COMPOUND PURGE SYSTEM FOR A MOTOR VEHICLE

TECHNICAL FIELD

This document relates generally to the motor vehicle equipment field and more particularly, to a system and method for purging volatile organic compounds from a motor vehicle as it is shipped from a first point to a second point such as from a manufacturing plant to a retail vehicle dealership.

BACKGROUND

Volatile organic compounds or VOCs are organic chemicals having low boiling points and vapor pressure at ambient temperatures. VOCs are numerous and are responsible for the "new car smell" characteristic of newly manufactured vehicles. For various reasons, it is desirable to remove or limit VOC concentrations in newly manufactured vehicles. This document relates to a system and method for accomplishing that goal.

SUMMARY

In accordance with the purposes and benefits described herein, a volatile organic compound purge system is provided for a motor vehicle. That system comprises a blower and a computing device configured to operate in "shipping mode" whereby the blower is periodically operated to draw fresh air into and purge volatile organic compounds from an interior of the motor vehicle as the motor vehicle is being shipped from a first point to a second point such as from a manufacturing plant or facility to a retail vehicle dealership.

In one possible embodiment the system further includes a battery voltage sensor for monitoring the voltage of the motor vehicle battery. In such an embodiment, the computing device is configured to terminate periodic operation of the blower whenever the voltage of the battery falls below a predetermined minimum voltage level.

In one possible embodiment of the system, the computing device includes a timer component for operating the blower for a predetermined period of time after each activation. Further, the computing device may include a counter component for counting each blower activation and terminating periodic operation of the blower when the activation count reaches a predetermined number.

In one possible embodiment, the system further includes a particle filter that replaces the standard HVAC filter provided in the ventilation system of the motor vehicle during the shipping of the motor vehicle. The particle filter has less airflow resistance than the standard HVAC filter thereby reducing the current drawn by the blower during the blower operation. This conserves the battery of the motor vehicle.

In another possible embodiment, a window insert is provided in a window opening of the motor vehicle above a partially opened window. The window insert provides a pathway for exhausting volatile organic compounds from the interior of the motor vehicle. That pathway is protected from rain and water intrusion by a rain deflector overlying the air pathway and from insect intrusion by a screen across the air pathway.

In accordance with yet another embodiment, the system further includes a filter pack that is provided in the interior of the motor vehicle for absorbing volatile organic compounds from air in the motor vehicle. In one particularly useful embodiment, the filter pack is charged with activated carbon which is particularly suited for this purpose.

In accordance with an additional aspect, a method of purging volatile organic compounds from a motor vehicle during shipping of the motor vehicle from a first point to a second point is provided. That method may be broadly described as comprising the step of operating a computer device in the motor vehicle in shipping mode and thereby periodically drawing fresh air into and purging volatile organic compounds from the interior of the motor vehicle by a blower in the motor vehicle. That method may further include activating the blower by the computing device at predetermined intervals of time and maintaining operation of the blower following activation for a predetermined operating time.

Still further, the method may include monitoring, by sensor, the voltage of the battery of the motor vehicle and terminating, by the computing device, the periodic drawing of fresh air and purging of volatile organic compounds when the battery voltage falls below a predetermined minimum level. Further, the method may include counting, by the computing device, each activation of the blower and terminating further activation of the blower upon the activation count reaching a predetermined value.

Still further the method may include positioning a window insert in a window opening above a partially opened window of the motor vehicle in order to provide an air pathway for exhausting volatile organic compounds from the interior of the vehicle. Further the method may include absorbing volatile organic compounds from the air inside the vehicle with a filter pack that is temporarily positioned inside the motor vehicle during shipping.

Still further the method may include replacing a standard HVAC filter in the ventilation system of the motor vehicle with a particulate filter having less airflow resistance than the standard HVAC filter thereby reducing the current drawn by the blower during blower operation. The standard HVAC filter may, of course, be stored in the motor vehicle during shipping.

Still further, the method includes initiating the shipping mode prior to shipping the motor vehicle from a manufacturing facility to a vehicle dealership. Further the method includes terminating the shipping mode and replacing the particulate filter with the standard HVAC filter upon the motor vehicle reaching the vehicle dealership.

In the following description, there are shown and described several preferred embodiments of the system and method. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the volatile organic compound purge system and together with the description serve to explain certain principles thereof. In the drawing figures.

Reference will now be made in detail to the present preferred embodiments of the purge system, examples of which are illustrated in the accompanying drawing figures.

DETAILED DESCRIPTION

Figure 1:
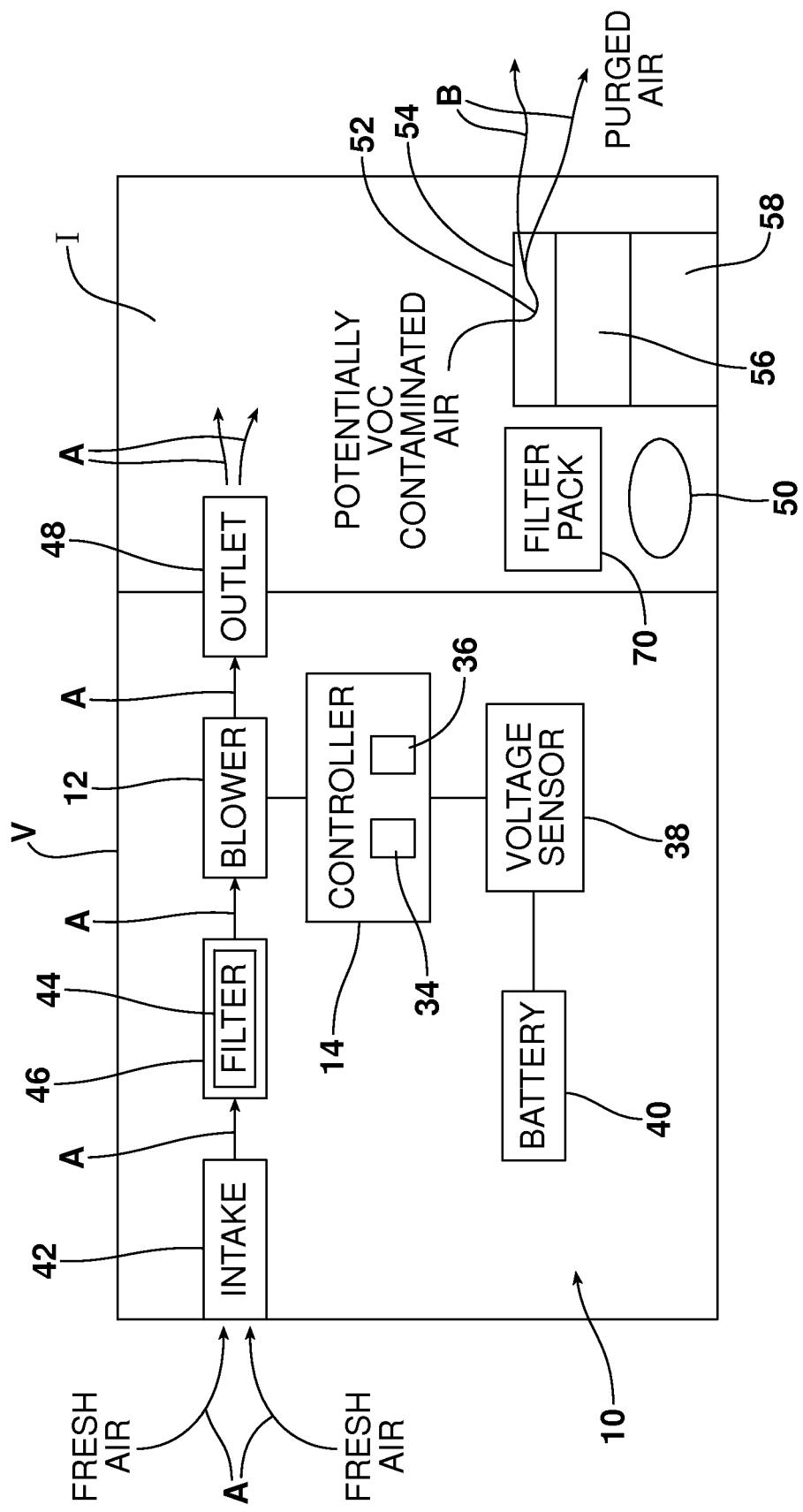
FIG. 1 is a schematic block diagram of the volatile organic compound purge system in a motor vehicle.

Reference is now made to FIG. 1 schematically illustrating the volatile organic compound (VOC) purge system 10 for a motor vehicle V. As illustrated, the system 10 incorporates a blower 12 and a computing device in the form of a controller 14.

Figure 2:
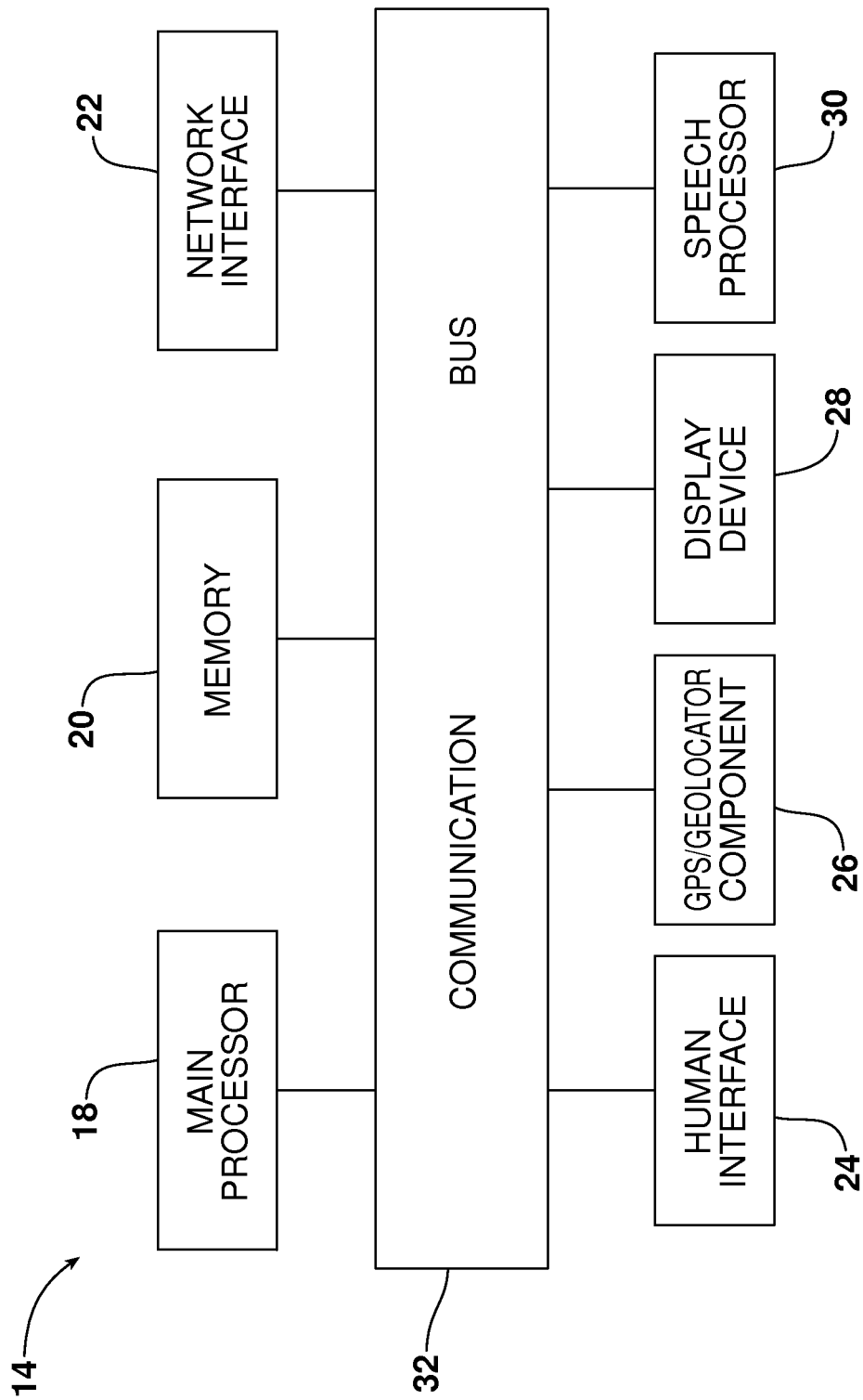
FIG. 2 is a schematic illustration of one possible embodiment for the controller of this system.

The blower 12 is a part of the standard vehicle ventilation system. The controller 14 may comprise a body control module (BCM). As illustrated in FIG. 2, the controller or BCM 14 comprises a computing device having one or more processors 18, one or more memories 20, one or more network interfaces 22, a human interface 24, a GPS/Geo locator component 26, a display device such as a multi-function display with touchscreen capability 28 and a speech processor 30 that all communicate with each other over a communication bus 32. The controller or BCM 14 performs a number of interior body electrically based functions including, for example, interior locking, remote key entry, interior lighting, exterior lighting, windshield wiper control and the like. In some embodiments the controller or BCM 14 may also function to control entertainment functions (e.g. radio, CD player and communications such as telephone and internet communications over a wireless network). In some embodiments the controller or BCM 14 is connected by a communication bus (not shown) to other control modules that provide one or more of these additional functions.

The controller 14 is configured to operate in "shipping mode" whereby the blower 12 is periodically operating to draw fresh air into and purge the VOCs from an interior I of the of the motor vehicle V as the motor vehicle is being shipped from a first point to a second point such as from a vehicle manufacturing facility to a retail vehicle dealership.

As further illustrated in FIG. 1, the controller 14 includes a timer component 34 that times the operation of the blower 12 after each activation. Once the blower 12 has been operating for a predetermined period of time such as, for example, two to four minutes, the controller 14 terminates operation of the blower 12.

As further illustrated in FIG. 1, the controller 14 also includes a counter component 36 for counting each blower activation. When the activation count reaches a predetermined number such as 20, 60 or even 80 blower activations, the controller 14 terminates the operation of the purge system 10 thereby forgoing any more periodic activations of the blower 12.

As further illustrated in FIG. 1, the controller 14 is connected to a voltage sensor 38 which monitors the voltage of the vehicle battery 40. The controller 14 is configured to terminate the periodic operation of the blower 12 whenever the voltage of the battery 40 falls below a predetermined minimum voltage level as detected by the voltage sensor 38.

As further illustrated in FIG. 1, the blower 12 is part of the standard motor vehicle ventilation system. When activated and operating, the blower 12 functions to draw fresh air into the intake 42 and through the filter 44 in the filter box 46 before forcing that fresh air through the outlet 48 into the interior I of the vehicle V. Here it should be appreciated that the filter 44 in the filter box 46 during the shipping of the vehicle from the first point to second point is a particle filter that replaces the standard HVAC filter of the ventilation system. For purposes of this document the terminology "particle filter" includes particle filters, screens and woven or nonwoven filter materials of any appropriate type. The particle filter 44 is characterized by significantly less airflow resistance than the standard HVAC filter thereby reducing the current drawn by the blower 12 during blower operation upon each activation during shipping mode. Advantageously this helps conserve the electrical power in the battery 40. The standard HVAC filter 50 may be placed anywhere in the motor vehicle V. Accordingly, upon reaching the shipping destination point, one can quickly and easily replace the particle filter 44, specifically adapted for shipping mode operation, with the standard HVAC filter 50 specifically adapted for standard operation of the ventilation system in the motor vehicle.

Figure 3:
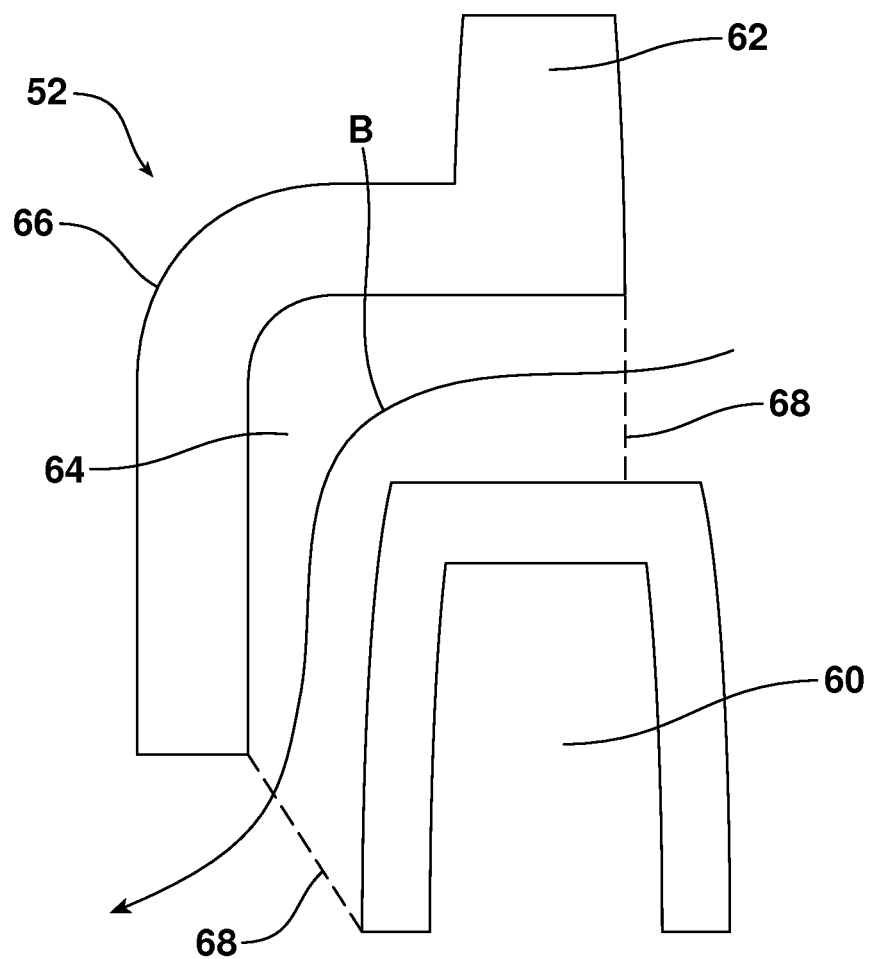
FIG. 3 is an illustration of a cross section of a window insert that is provided in a window opening of the motor vehicle above a partially opened window in order to provide a pathway for exhausting volatile organic compounds from the interior of the motor vehicle.

As further illustrated in FIG. 1, the system 10 also includes a window insert 52 that is positioned in a window opening 54 of the motor vehicle above a partially opened window 56 in one of the vehicle doors 58. The insert 52 may be made from injected molded plastic. As schematically illustrated in FIG. 3, the window insert 52 includes a channel 60 for receiving the top edge of the window 56 and a positioning flange 62 for engaging in the window seal at the top of the window opening 54. Thus, it should be appreciated that the window insert 52 is captured in the window opening 54 between the window seal and the window 56, extending completely across that opening as illustrated in FIG. 1.

As further illustrated in FIG. 3, the window insert 52 includes an airflow pathway 64. When the controller 14 activates the blower 12, fresh air is drawn into the intake 42 and passes through the filter 44 into the blower 12 before being forced from the outlet 48 into the interior I of the vehicle V (note action arrows A). This air sweeps potentially VOC contaminated air within the interior I forcing it to pass through the air flow pathway 64 in the window insert 52 and exit the vehicle (note action arrows B in FIGS. 1 and 3). A rain shield 66 overlies the pathway 64 thereby effectively preventing rain and water intrusion into the interior I of the vehicle V through the pathway 64. One or more screens or grid structure 68 extending completely across the airflow pathway 64 prevent insect intrusion into the interior I of the vehicle V through the pathway.

As further illustrated in FIG. 1, in one possible embodiment the purge system 10 also includes one or more filter packs 70 that may be positioned anywhere in the interior I of the vehicle V. Each filter pack 70 may be charged with activated carbon or some other VOC absorbing material and functions to remove VOCs from the air inside the vehicle V even when the blower 12 is between periodic operating cycles. This helps to further clear the VOCs during shipping.

As should be appreciated from above, the VOC purge system 10 functions in accordance with a method of purging volatile organic compounds from a motor vehicle during the shipping of the motor vehicle from a first point to a second point. That method includes initiating "shipping mode" of the controller 14 prior to shipping the motor vehicle V from, for example, a manufacturing facility to a retail vehicle dealership. When operating in shipping mode, the computing device or controller 14 in the motor vehicle V activates the blower 12 in a manner necessary to periodically draw fresh air into and purge volatile organic compounds from the interior I of the motor vehicle V. This activation occurs at predetermined intervals of time such as, for example, once a day. Further, the controller 14, consistent with a timer component 34 operates the blower 12 for a predetermined operating time after each activation.

Consistent with the method, the voltage sensor 38 monitors the voltage of the vehicle battery 40. In the event that the battery voltage falls below a predetermined minimum level, the controller 14 terminates the operation of the blower 12. Consistent with the counter component 36 of the controller 14, each activation of the blower 12 is counted and further activation is terminated upon the activation count reaching a predetermined value.

Upon reaching the desired destination, or prior to delivery to the final customer the method includes terminating the shipping mode of operation of the controller 14 and replacing the particulate filter 44 in the filter box 46 with the standard HVAC filter 50 that was previously stored in the motor vehicle V during shipping.

Figure 4:
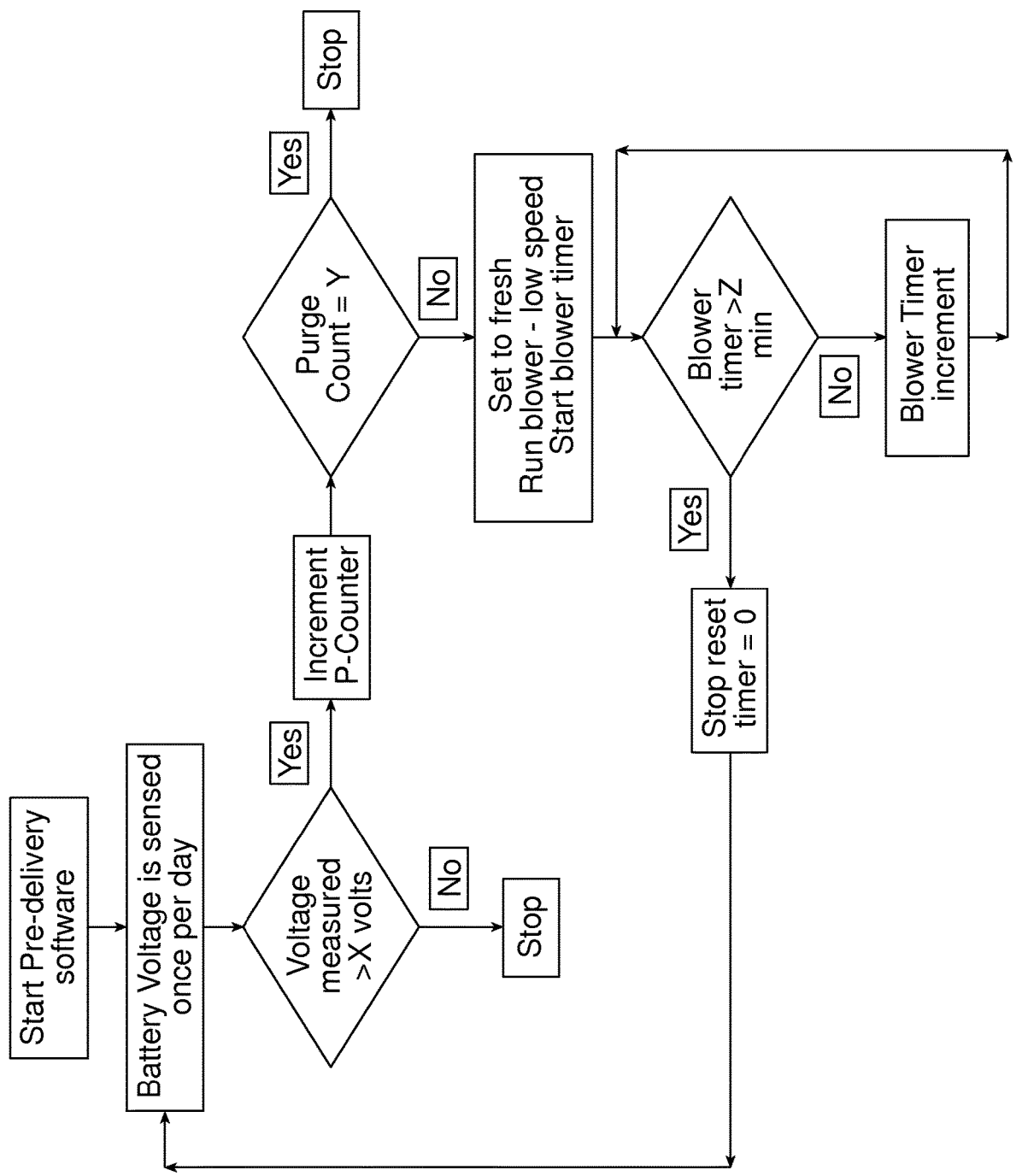
FIG. 4 is an operational flowchart for the volatile organic compound purge system.

An operational flowchart clearly and concisely illustrating the operation of one possible embodiment of the VOC purge system 10 is set forth in FIG. 4.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breath to which they are fairly, legally inequitably entitled.

What is claimed:

1. A volatile organic compound purge system for a motor vehicle, comprising:
    a blower;
    a computing device configured to operate in a shipping mode whereby said blower is periodically operated to draw fresh air into and purge volatile organic compounds from an interior of said motor vehicle as said motor vehicle is being shipped from a first point to a second point; and
    a first filter and a second filter, wherein the second filter replaces the first filter in a ventilation system of said motor vehicle during shipping of the motor vehicle, said second filter having less airflow resistance than said first filter thereby reducing current drawn by said blower during blower operation.

2. The system of claim 1 further including a battery voltage sensor for monitoring voltage of a battery in said motor vehicle, said computing device configured to terminate periodic operation of said blower whenever said voltage of said battery falls below a predetermined minimum voltage level.

3. The system of claim 2 wherein said computing device includes a timer component for operating said blower for a predetermined period of time after each activation.

4. The system of claim 3 wherein said computing device includes a counter component for counting each blower activation and terminating periodic operation of said blower when an activation count reaches a predetermined number.

5. The system of claim 4, further including a window insert provided in a window opening above a partially opened window of the motor vehicle, said window insert providing a pathway for exhausting volatile organic compounds from said interior of the motor vehicle.

6. The system of claim 5, wherein said window insert further includes a rain deflector and a screen to prevent rain, water, and insect intrusion into said motor vehicle through said pathway.

7. The system of claim 6, further including a filter pack provided in said interior of said motor vehicle for absorbing volatile organic compounds from air in said motor vehicle.

8. The system of claim 7, wherein said filter pack is charged with activated carbon.

9. A method of purging volatile organic compounds from a motor vehicle during shipping of said motor vehicle from a first point to a second point, comprising:
    operating a computing device in said motor vehicle in a shipping mode and thereby periodically drawing fresh air into and purging volatile organic compounds from an interior of said motor vehicle by a blower in said motor vehicle;
    activating said blower, by said computing device, at predetermined intervals of time and maintaining operation of said blower following activation for a predetermined operating time;
    monitoring, by sensor, voltage of a battery of said motor vehicle and terminating, by said computing device, said periodic drawing of fresh air and purging of volatile organic compounds when said voltage falls below a predetermined minimum level;
    counting, by said computing device, each activation of said blower and terminating further activation of said blower upon an activation count reaching a predetermined value;
    positioning a window insert in a window opening above a partially opened window of said motor vehicle in order to provide an air pathway for exhausting volatile organic compounds from said interior of said vehicle;
    absorbing volatile organic compounds from air inside said vehicle with a filter pack positioned inside said motor vehicle during the shipping mode; and
    replacing a first filter in a ventilation system of said motor vehicle with a second filter having less airflow resistance than said first filter thereby reducing current drawn by said blower during blower operation.

10. The method of claim 9, including storing said first filter in said motor vehicle during shipping.

11. The method of claim 10 including initiating shipping mode prior to shipping said motor vehicle from a manufacturing facility to a vehicle dealership or customer.

12. The method of claim 11 including terminating shipping mode and replacing said second filter with said first filter upon said motor vehicle reaching said vehicle dealership or customer.

13. A method of purging volatile organic compounds from a motor vehicle comprising:
    shipping said motor vehicle from a first point to a second point with a shipping mode filter in a ventilation system of the motor vehicle;
    operating a computing device in said motor vehicle in a shipping mode during the shipping of the motor vehicle from a first point to a second point, thereby periodically drawing fresh air into and purging volatile organic compounds from an interior of said motor vehicle by a blower in said motor vehicle; and
    replacing said shipping mode filter with an HVAC filter following shipping wherein said shipping mode filter has less airflow resistance than said HVAC filter thereby reducing current drawn by the blower when operated during shipping.

* * * * *